Sept. 8, 1970 F. A. OLIVER ET AL 3,527,899

MAGNETIC TAPE TRANSDUCER HEAD WITH SHIELDED HOUSING AND PRINTED CIRCUIT CONNECTION BOARDS

Filed May 1, 1967 2 Sheets-Sheet 1

INVENTORS
FRANCIS A. OLIVER
DONALD P. HUMPHREYS

BY Trask, Jenkins & Hanley

ATTORNEYS

INVENTORS
FRANCIS A. OLIVER
DONALD P. HUMPHREYS
BY
Trask, Jenkins & Hanley
ATTORNEYS United States Patent Office 3,527,899
Patented Sept. 8, 1970

3,527,899

MAGNETIC TAPE TRANSDUCER HEAD WITH SHIELDED HOUSING AND PRINTED CIRCUIT CONNECTION BOARDS

Francis A. Oliver and Donald P. Humphreys, Columbus, Ind., assignors to Arvin Industries, Inc., Columbus, Ind., a corporation of Indiana Filed May 1, 1967, Ser. No. 635,100
Int. Cl. G11b 5/28, 5/42, 5/10
U.S. Cl. 179—100.2 6 Claims

ABSTRACT OF THE DISCLOSURE

A transducer head for use with magnetic tape comprising a pair of opposed shells each having its own half C-core provided with a wire coil. The ends of the coil are connected to a printed circuit board in each shell. The shells are mounted in opposed relation in a housing with their core halves joined to form a completed loop and their printed circuit boards electrically interconnected to each other and to a common terminal board carried in said shells.

SUMMARY OF THE INVENTION

In accordance with one form of the invention, there is provided a transducer head having a pair of opposed shells mounted in a housing. Each of said shells has mounted therein a pair of laterally spaced C-shaped core halves. One of the legs on each of said core halves is carried within a nose formed on the shell, and said nose and leg project through an opening in the housing for engagement with a magnetic tape moving over said housing. Another leg on each of said core halves has a coil of wire mounted thereon with the ends of said wire being connected to a pair of terminals on a printed circuit board mounted in the shell.

The two shells are interconnected with the ends of the core legs in abutting engagement with each other and the ends of their circuit boards in abutting engagement. A terminal board is mounted in the connected shells in juxtaposition to the circuit boards. Said terminal board has a plurality of terminal pins connected to the circuit board terminals and projecting outwardly from the housing for connection to the desired receptacle.

BRIEF DESCRIPTION OF THE DRAWINGS

The accompanying drawings illustrate the invention. In such drawings.

DETAILED DESCRIPTION

Figure 1:
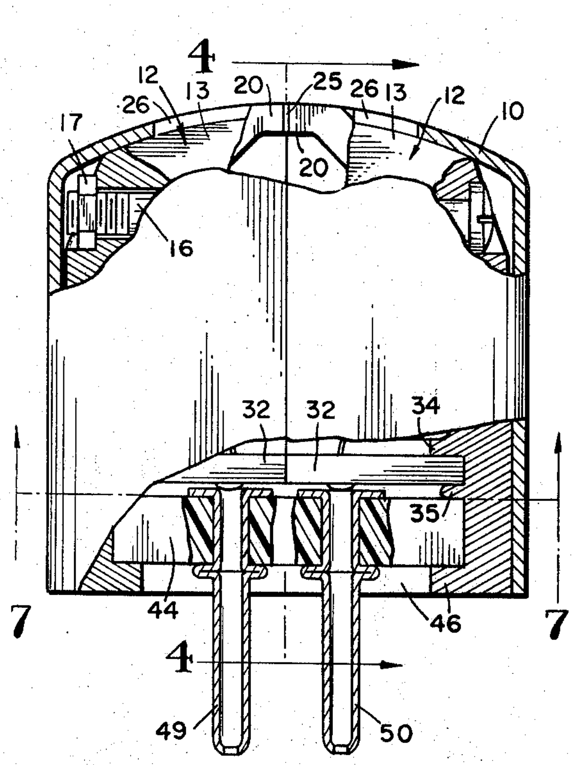
FIG. 1 is a side elevation of a transducer head embodying the invention with portions thereof being broken away.

The head shown in the drawings is adapted for transducing stereo signals from a magnetic tape, and thus employs a pair of spaced pickups. As shown, said head comprises a housing 10 having a pair of opposed shells 12 mounted therein. Each of said shells has a pair of side walls 13, interconnected by end and top walls 14 and 15. Thus, each of the shells is open at its lower end and along its inner face. The shells are rigidly interconnected at their opposed open inner faces by a bolt 16 supported in openings in the shell walls 14 adjacent the upper ends thereof and threadably connected to a nut 17.

Figure 5:
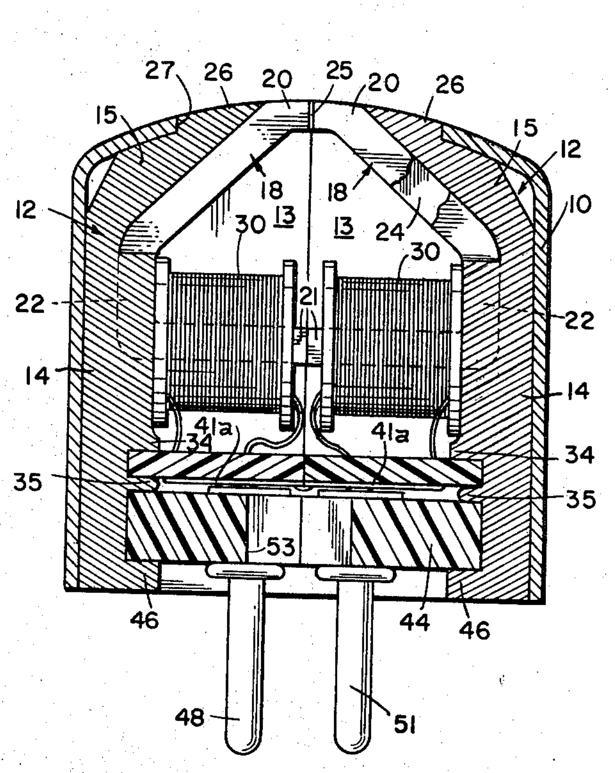
FIG. 5 is a perspective view of one of the core halves shown in FIG. 4.
Figure 6:
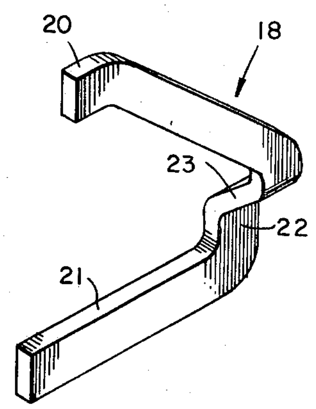
FIG. 6 is a vertical section taken on the line 6—6 of FIG. 4.

A pair of laterally spaced C-shaped core halves 18 are mounted in each shell 12 on opposite sides of the bolt 16. As shown in FIG. 5, each of said core halves is formed from a unitary length of wire having a rectangular cross-section and bent into a generally C-shape. In this manner, the grain in each of said halves will run longitudinally of the core half and thereby provide a uniform reluctance path throughout the length of said core halves. Each of the core halves 18 has an upper short leg 20 interconnected to a longer parallel bottom leg 21 by an intermediate leg 22. The leg 22 has a lateral offset 23 intermediate its length to thus provide a greater lateral spacing between the legs 21 in each shell. The use of wire cores permits the cores to be bent along smooth curves to eliminate sharp corners producing discontinuities. It further permits the production of cores without the generation of any scrap as in conventional core manufacturing operations where the cores are stamped out of sheet material.

The core legs 22 are seated in slots 24 formed in the inner faces of the shell walls 14 with the legs 20 and 21 projecting inwardly therefrom. The inner ends of the legs 21 in the two shells are disposed in abutting engagement with each other, and a thin strip 25 of non-magnetic material is interposed between the inner ends of the legs 20 in the two shells. Thus, the pair of aligned core halves 18 in the two shells form a pair of laterally spaced looped cores.

Figure 2:
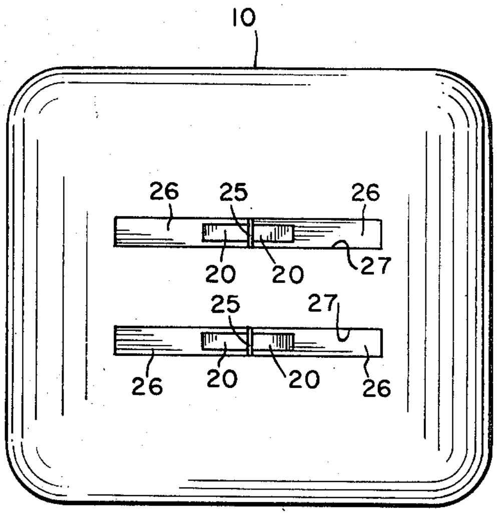
FIG. 2 is a top plan view of the head shown in FIG. 1.

As shown, the upper ends of the cores formed by the legs 20 are received in upwardly projecting noses 26 formed in the shell top walls 15. The noses with the core legs 20 disposed therein project through a pair of spaced elongated slots 27 formed in the upper wall of housing 10 with the upper faces of said noses and legs being generally coplanar with said upper housing wall for engagement with the tape moving thereover. As shown in FIG. 2, each pair of noses extends along the sides and outer ends of each pair of legs 20 to form peripheral borders around the tape-engaging faces of the cores. Desirably, the noses 26 project outwardly from the cores beyond the widths of the tape tracks engageable with the cores to prevent said cores from receiving signals from adjacent tracks and thus reduce cross-talk.

A bobbin 28 having a wire coil 30 is mounted on each of the legs 21. Because of the offsets 23 in the core legs 22, the legs 21 in each shell are disposed in a substantially laterally spaced relation to each other so that each of the coils can have a large number of turns. When the head is used in a playback mode, the larger number of turns permits larger playback voltages to be generated by any given flux densities stored on the tape.

Figure 7:
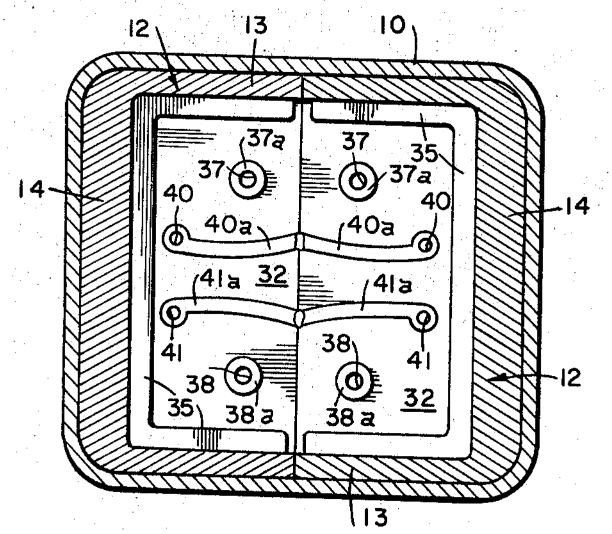
FIG. 7 is a horizontal section taken on the line 7—7 of FIG. 1.

As shown, the ends of the coils 30 in each shell are connected to a printed circuit board 32 mounted therein. The margins of the boards are disposed between vertically spaced shoulders 34 and 35 projecting inwardly from the shell walls 13 and 14. Each of the boards 32 has a pair of openings 37 and 38 extending therethrough and one of the leads from each of the coils in its shell extend through said openings and are connected to the boardo terminals 37*a* and 38*a*. The other lead on each of the coils projects through openings 40 and 41 formed in the board and are connected to the board terminals 40*a* and 41*a*. As shown in FIG. 7, the terminals 40*a* and 41*a* extend to the inner edges of the boards with their inner ends disposed in contact with the inner ends of the contacts 40a and 41a on the board carried in the other shell. Thus, the coils in one shell are electrically connected to the coils in the other shells to provide a pair of wired cores each having a pair of coils wired in series aiding relationship. The connection between the terminals 40a and 41a on the boards 32 also provides a center tap which gives the head the ability to be grounded, adding a push-pull feature, etc.

Figure 3:
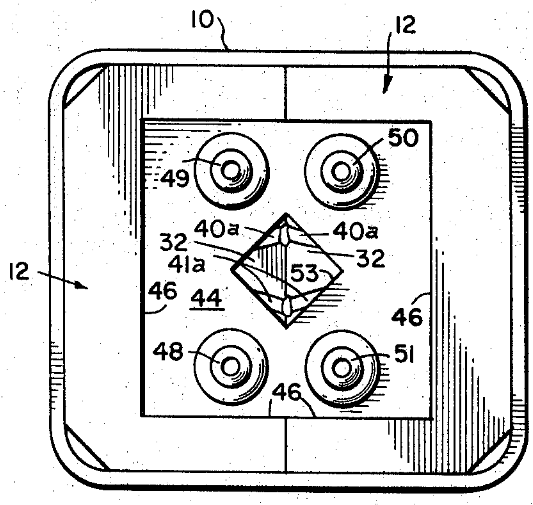
FIG. 3 is a bottom plan view of the head shown in FIG. 1.
Figure 4:
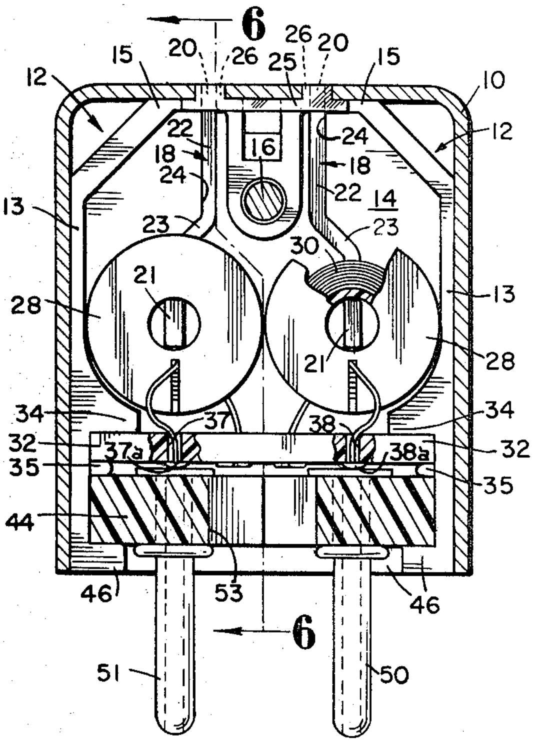
FIG. 4 is an enlarged vertical section taken on the line 4—4 of FIG. 1, with portions thereof being broken away.

A terminal board 44 is carried in the lower ends of the shells 12 in juxtaposition to the boards 32. As shown in FIG. 4, each of the shells has a shoulder 46 projecting inwardly from its walls 13 and 14 at the lower edges thereof whereby the board 44 is retained between the shell shoulders 35 and 46. The board 44 spans and closes the lower ends of the assembled shells 12 and acts in combination with the bolt 16 to help hold the lower ends of the shells in alignment with each other. As shown in FIG. 3, four hollow conductive pins 48, 49, 50, and 51 extend through the board 44 and project outwardly from the lower ends of the shells. The pins 48–51 are disposed in vertical alignment with the terminals 37a and 38a on the boards 32. Thus, soldered connections can be easily formed between each of the pins and its associated terminal 37a or 38a by introducing the solder through the hollow pins. Conveniently, the board 44 has an opening 53 formed therein in alignment with the abutting ends of terminals 40a and 41a on the two boards 32 to facilitate soldering the ends of said terminals together.

As will be apparent, this invention permits each of the shells 12 with its several components mounted therein to be fabricated as a subassembly. After each such subassembly is made, it can be tested independently of the other. This permits a quality control check to be made before its final assembly, and if any shell subassembly is found defective, it can be replaced without the necessity of replacing both shell halves.

While the instant invention has been described as employing a pair of cores, formed by the core halves 18, it is to be understood, of course, that any number of such cores may be employed in the head.

We claim:

1. A transducer head for use with magnetic tape, comprising a housing, a pair of opposed shells mounted in said housing, a pair of members mounted in said shells forming a core, a portion of which projects through an opening in said housing for engagement with said tape, coil means on said members, a printed circuit board mounted in each of said shells on a first set of aligned shoulders disposed below said coil means, each of said printed circuit boards being connected to said coil means, and a terminal board mounted on a second set of aligned shoulders in said shells disposed below said first set of shoulders, said terminal board closing the lower ends of said shells and having a plurality of pins connected to said printed circuit boards and projecting outwardly from said housing.

2. A transducer head for use with magnetic tape, comprising a housing, a pair of opposed shells mounted in said housing, a pair of laterally spaced core halves mounted in each of said shells, each of said core halves having upper and lower legs interconnected by an intermediate leg, means interconnecting said shells to dispose the inner ends of said upper and lower legs in operative engagement with each other whereby said core halves form a pair of cores, a thin strip of non-magnetic material interposed between the inner ends of said upper legs, said upper legs projecting through opening in said housing for engagement with said tape, a coil wound around each of said lower legs, a printed circuit board in each shell connected to the coils therein, said printed circuit boards having their inner edges in abutting engagement with each other and provided with aligned conductive means for electrically interconnecting the cores in said shells, and a terminal board mounted in said shells having a plurality of pins electrically connected to said printed circuit boards and projecting outwardly therefrom.

3. A transducer head for use with magnetic tape, comprising a housing, a pair of opposed shells mounted in said housing, a pair of laterally spaced core halves mounted in each of said shells, each of said core halves having upper and lower legs interconnected by an intermediate leg, means interconnecting said shells to dispose the inner ends of said upper and lower legs in operative engagement with each other whereby said core halves form a pair of cores, a thin strip of non-magnetic material interposed between the inner ends of said upper legs, said upper legs projecting through openings in said housing for engagement with said tape, a coil wound around each of said lower legs, a printed circuit board in each shell connected to the coils therein, said printed circuit boards having their inner edges in abutting engagement with each other and provided with aligned conductive means for electrically interconnecting the cores in said shells, a terminal board mounted in said shells having a plurality of pins electrically connected to said printed circuit boards and projecting outwardly therefrom, each of said coils being connected to a pair of terminals on the printed circuit board in its shell, and a pair of said terminals on one of said printed circuit boards is connected to a pair of said terminals on the other printed circuit board whereby the pair of coils on each of said cores are connected in series.

4. A transducer head for use with magnetic tape, comprising a housing, a pair of cores carried in said housing and projecting through openings therein for engagement with said tape, a pair of coils mounted on each of said cores, a pair of printed circuit boards mounted in said housing, one of said printed circuit boards having a pair of first terminals connected to one end of each of a first pair of said coils on said cores and a pair of second terminals connected to the other end of each of said first pair of coils, the other of said printed circuit boards having a pair of first terminals connected to one end of each of the second pair of said coils on said cores and a second pair of terminals connected to the other end of each of said second pair of coils, said first pairs of terminals on said boards being connected to each other, and a terminal board having a plurality of pins connected to said second pairs of terminals and projecting outwardly from said housing.

5. The invention as set forth in claim 4 in which said printed circuit boards are interposed between said cores and terminal board, said terminal board has an opening therein in alignment with the connections between said first pairs of terminals, and said pins are hollow sleeves.

6. The invention as set forth in claim 4 in which said printed circuit boards are interposed between said cores and terminal boards, said terminal board has an opening therein in alignment with the connections between said first pairs of terminals, and said pins are hollow sleeves disposed in alignment with said second pairs of terminals.

References Cited

UNITED STATES PATENTS

| | | | |
|---|---|---|---|
| 2,914,621 | 11/1959 | Donceel et al. | 179—100.2 |
| 3,211,843 | 10/1965 | Dundovic et al. | 179—100.2 |
| 3,299,218 | 1/1967 | Wagenhals | 179—100.2 |
| 3,243,519 | 3/1966 | Parstorfer | 179—100.2 |
| 3,432,921 | 3/1969 | Page | 179—100.2 |

BERNARD KONICK, Primary Examiner

J. R. GOUDEAU, Assistant Examiner

U.S. Cl. X.R.

340—174.1